July 31, 1923.
K. LÖWINGER
VALVE
Filed Feb. 23, 1921
1,463,169
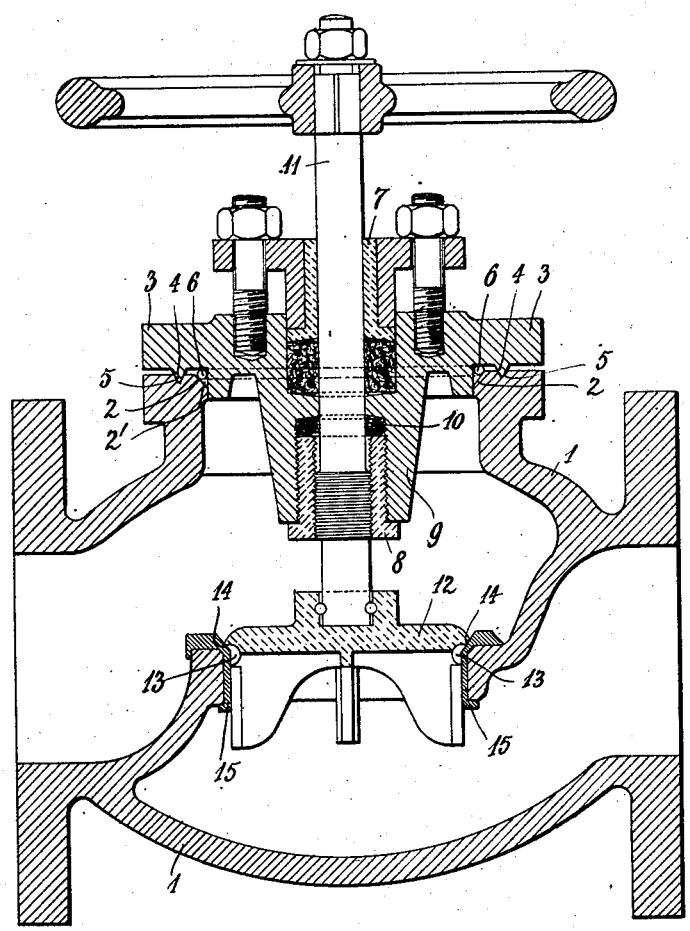
Karl Löwinger INVENTOR.
BY
ATTORNEY.

Patented July 31, 1923.

1,463,169

UNITED STATES PATENT OFFICE.

KARL LÖWINGER, OF MORAVSKA OSTRAVA, CZECHOSLOVAKIA.

VALVE.

Application filed February 23, 1921. Serial No. 447,104.

*To all whom it may concern:*

Be it known that I, KARL LÖWINGER, residing at Moravska Ostrava, Milicova 3, Czechoslovakia, have invented certain new and useful Improvements in Valves, of which the following is a specification.

This invention relates to valves, and its purpose is to provide a device of simple construction which insures at the same time a high degree of efficiency in operation.

Valves as used hitherto in water, steam and oil conduits have the great drawback that it is difficult to provide an absolutely tight joint owing to the fact the packing boxes used in connection with such valves generally begin to leak after a relatively short time, allowing the liquid or fluid conveyed in the conduit to escape along the valve stem, thus causing loss of material, danger of fire, or annoyance to the working men.

In most valves as constructed hitherto, it is impossible, or nearly so, to renew the packing material without interrupting the operation and the entire conduit of which such valve forms a part has to be closed, resulting often in very unpleasant interruptions of operation.

All these drawbacks are avoided by my present invention, according to which I provide, on the inside of the valve cover, a packing box insuring a tight joint around the valve stem. Furthermore the valve casing has in its upper face an inwardly-extending beveled surface, thus providing between the casing and the cover an annular space for the reception of a washer or packing ring made of soft metal or the like, which, when the cover is pressed down on the casing, will be wedged in between the cover and the beveled surface of the casing, thus insuring a tight joint at this point. The seat-engaging surface of the valve is reduced to a more or less sharp edge, so as to provide a tight joint at all points of the seat engaging surface. Moreover, the valve seat is readily and quickly exchangeable by making it in the form of a sleeve which is attached to the casing in any suitable manner as by bending its edges over the adjacent portions of the casing.

In the accompanying drawing, I have illustrated, as an example, a preferred form of my invention, this drawing showing a central longitudinal section of valve.

The valve casing 1 is provided in its upper portion with an inwardly-facing beveled surface 2. The cover 3 has in its lower surface a beveled or wedge-shaped ridge 4 engaging a correspondingly-shaped groove 5 in the upper surface of the valve casing, and owing to this construction an annular space is provided between the beveled surface 2 and the cover 3, in which is located a packing ring or washer 6 made of a soft metal or other suitable material. When the cover 3 is secured to the casing 1 in the usual manner, say by means of screws (not shown) the ring 6 will be tightly wedged between the cover and the casing, thus insuring a tight joint at this place.

In addition to the ordinary packing box at the outside of the cover, provided with the gland 7, the cover is provided with another packing box located in the inside of the valve casing in a suitable inward projection 9 of the cover 3. The gland 8 of this inner packing box is shown as screwed into the projection 9, but it will be evident that it may be secured thereto in other ways. Suitable packing 10 is provided in this inner packing box between the inner end of the gland 8 and the cover 3. A tight joint is therefore provided between the valve stem and the cover not only by the usual packing box at the outside of the cover, but also by the packing 10 of the inner packing box. Inasmuch as the threaded gland 8 of this inner packing box compresses the packing 10 against the cover 3 so as to provide a tight inner joint, the packing and gland 7 of the outer packing box can be readily removed for the purpose of renewing its packing, without necessitating first the closing of the valve.

In contradistinction to the usual constructions, the valve 12 is not formed with a more or less large conical surface engaging the valve seat 13, but with a circumferential edge 14 (which by a small amount of grinding may be formed, if desired, into a very narrow surface) which edge will insure proper engagement of the valve plug with its seat and therefore will securely shut off one valve compartment from the other.

Instead of being made, as usual, in the shape of a valve ring, which requires very accurate work and cannot be replaced very readily, the valve seat is formed by a sleeve 15 made of bronze, sheet nickel or other suitable material, and it may be secured to the valve casing by bending or crimping its edges over the adjacent portions of the casing. This construction affords the great advantage of permitting the valve seat to be replaced quickly and cheaply, which is of especial importance when one and the same valve is used for passing different liquids or fluids, such as water, superheated steam, gasolene, oil, and the like. These valve seats can be readily manufactured in large quantities. Instead of securing the valve seat sleeves to the casing in the manner shown, this may be done in any other suitable manner, as for instance by suitable screws. Owing to the exchangeability of the valve seat and to the other advantages mentioned above, my improved valve will give exceedingly long wear.

Various modifications may be made without departing from the nature of my invention as set forth in the appended claim.

I claim as my invention:—

A valve comprising a casing and a cover therefor, said casing having in its upper face a beveled surface extending inwardly and forming with said cover an annular space, and a packing ring in said space adapted to be pressed against said beveled surface by the pressure exerted by said cover, so as to form a tight-joint between said cover and said casing.

In testimony whereof I have affixed my signature.

ING. KARL LÖWINGER.

Witnesses:
 JAN B. VOJÁČEK,
 GUSTAV ROHONE.